US011945209B2

(12) United States Patent
Odum et al.

(10) Patent No.: US 11,945,209 B2
(45) Date of Patent: Apr. 2, 2024

(54) METHODS AND DEVICES FOR PRINTING ON SUBSTRATES

(71) Applicant: Shaw Industries Group, Inc., Dalton, GA (US)

(72) Inventors: Thomas Odum, Tunnel Hill, GA (US); James K. Henry, Rock Spring, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 17/941,706

(22) Filed: Sep. 9, 2022

(65) Prior Publication Data

US 2023/0070994 A1 Mar. 9, 2023

Related U.S. Application Data

(60) Provisional application No. 63/298,712, filed on Jan. 12, 2022, provisional application No. 63/242,060, filed on Sep. 9, 2021.

(51) Int. Cl.

| | |
|---|---|
| ***B41J 3/407*** | (2006.01) |
| ***B41F 17/08*** | (2006.01) |
| ***B41F 19/00*** | (2006.01) |
| ***B41F 19/06*** | (2006.01) |
| ***B41J 3/54*** | (2006.01) |
| *B44C 1/24* | (2006.01) |

(52) U.S. Cl.
CPC ............ *B41F 19/062* (2013.01); *B41F 17/08* (2013.01); *B41F 19/007* (2013.01); *B41J 3/407* (2013.01); *B41J 3/543* (2013.01); *B44C 1/24* (2013.01)

(58) Field of Classification Search
CPC ...... B41F 19/062; B41F 17/08; B41F 19/007; B41J 3/407; B41J 3/543; B44C 1/24
See application file for complete search history.

(56) References Cited

U.S. PATENT DOCUMENTS

| | | | | |
|---|---|---|---|---|
| 4,110,152 | A | 8/1978 | Dunning | |
| 4,790,428 | A | 12/1988 | Ramsey | |
| 6,041,533 | A | 3/2000 | Lemmond | |
| 2003/0076396 | A1 | 4/2003 | Imai | |
| 2009/0040270 | A1 | 2/2009 | Silverbrook | |
| 2012/0113199 | A1* | 5/2012 | Edwards ................ | B41J 15/165 347/102 |

(Continued)

FOREIGN PATENT DOCUMENTS

JP 2015149121 A * 8/2015 ............... H01B 1/22

OTHER PUBLICATIONS

Search Report and Written Opinion of corresponding PCT Application No. PCT/US22/43061.

*Primary Examiner* — Yaovi M Ameh
(74) *Attorney, Agent, or Firm* — Ballard Spahr LLP

(57) ABSTRACT

A system for printing on a substrate can comprise a conveyor that is configured to move the substrate along a substrate movement axis. The system can further comprise at least one print head array. Each print head array has a plurality of print heads, each print head having a respective orientation axis. The plurality of print heads can have at least a first print head and a second print head, wherein the orientation axis of the first print head is angularly offset from the orientation axis of the second print head. The first print head can be offset from the second print head along the substrate movement axis.

20 Claims, 12 Drawing Sheets

(56) References Cited

U.S. PATENT DOCUMENTS

| | | | | |
|---|---|---|---|---|
| 2012/0199021 | A1 * | 8/2012 | Till | B41F 17/28<br>101/36 |
| 2015/0298467 | A1 * | 10/2015 | Cofler | B41J 3/4073<br>347/16 |
| 2017/0152392 | A1 | 6/2017 | Pervan | |

* cited by examiner

METHODS AND DEVICES FOR PRINTING ON SUBSTRATES

CROSS-REFERENCE TO RELATED APPLICATIONS

This application claims priority to and the benefit of the filing date of U.S. Provisional Patent Application Nos. 63/242,060, filed Sep. 9, 2021, and 63/298,721, filed Jan. 12, 2022, the entirety of each of which is hereby incorporated by reference herein.

FIELD

This application is directed to systems and methods for printing on substrates.

BACKGROUND

Trim pieces such as ¼ round, transition and threshold pieces have been used for many years to give a finished look to a floor installation. These trim pieces are added to a floor installation to provide a clean and defined transition from the flooring to adjacent surfaces that are both flat and vertical. Today these trim pieces can be made of wood, wood composites and/or plastics. Wood trim pieces are typically stained or painted to match the surrounding décor (of the flooring or other adjacent surfaces). Composite or plastic trim pieces are typically wrapped with a foil with an image that matches the pattern of the flooring.

SUMMARY

Disclosed herein, in one aspect, is a system for printing on a substrate. Optionally, the substrate can be a trim piece. The system can comprise a conveyor that is configured to move the substrate along a substrate movement axis. The system can further comprise at least one print head array, wherein each print head array of the at least one print head array comprises a plurality of print heads. Each print head of the plurality of print heads can have a respective orientation axis. The plurality of print heads can comprise at least a first print head and a second print head. The orientation axis of the first print head can be angularly offset from the orientation axis of the second print head about the substrate movement axis. The first print head can be offset from the second print head along the substrate movement axis.

In another aspect, a method comprises moving a substrate along a substrate movement axis, wherein the substrate has a surface having a first portion and a second portion, wherein the first portion or a plane tangential thereto is angularly offset from the second portion or a plane tangential thereto. The method further comprises simultaneously printing on the first portion and the second portion of the surface of the substrate. Optionally, the substrate can be a trim piece.

In another aspect, system for printing on a substrate can comprise a conveyor that is configured to move the substrate along a substrate movement axis. The system can further comprise at least one print head array. Each print head array of the at least one print head array can comprise at least one print head. Each print head array of the at least one print head array can comprise a first plurality of nozzles spaced along a respective nozzle row axis. The respective nozzle row axis of at least one print head of the at least one print head print head can be oriented at an acute angle relative to the substrate movement axis.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Figure 1:
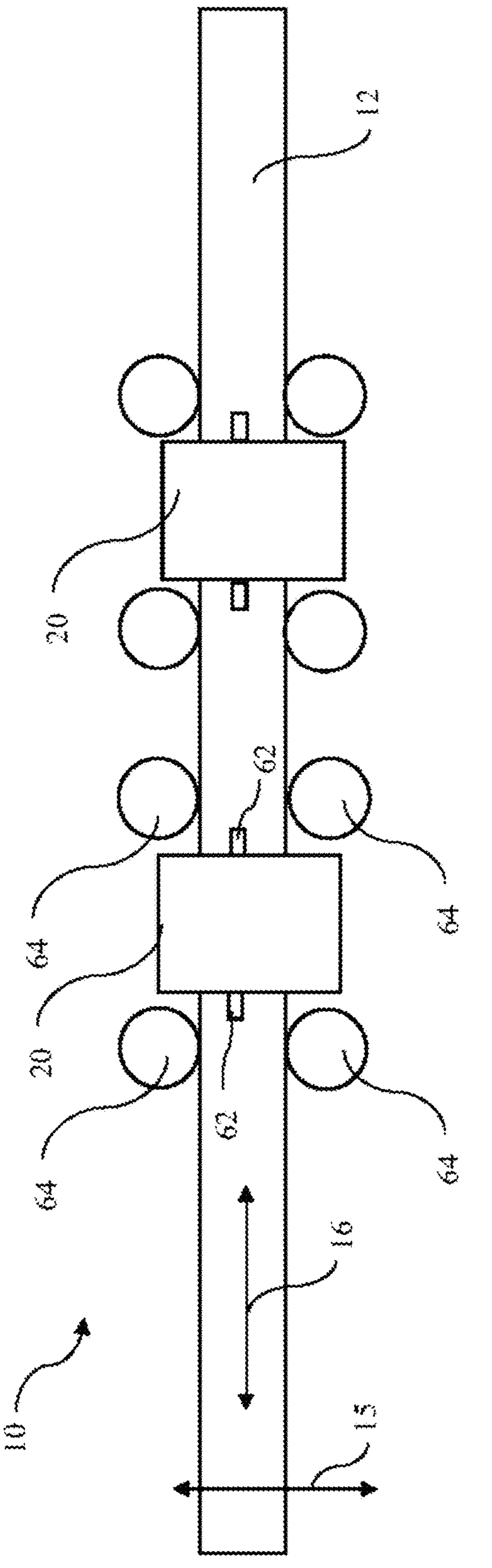
FIG. 1 is a top plan schematic diagram of an exemplary system for printing as disclosed herein.

The present invention can be understood more readily by reference to the following detailed description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms “a,” “an,” and “the” include plural referents unless the context clearly dictates otherwise. Thus, for example, reference to “a print head” can include two or more such print heads unless the context indicates otherwise.

Optionally, in some aspects, when values are approximated by use of the antecedents “about,” “substantially,” or “generally,” it is contemplated that values within up to 15%, up to 10%, up to 5%, or up to 1% (above or below) of the particularly stated value or characteristic can be included within the scope of those aspects.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect. It will be further understood that the endpoints of each of the ranges are significant both in relation to the other endpoint, and independently of the other endpoint.

As used herein, the terms “optional” or “optionally” mean that the subsequently described event or circumstance may or may not occur, and that the description includes instances where said event or circumstance occurs and instances where it does not.

As used herein, “substrate” should be understood to mean any element or component that is, or can be, printed on or embossed by the systems disclosed herein. The substrate can include a core (e.g., a wood or polymer material, organic or inorganic material, natural or synthetic material) and, optionally, a core having one or more of a primer and/or other coating and/or other layer(s) applied thereto.

Referring to FIGS. 1-4 and 7, a system 10 can be configured to print on a substrate 12, such as, for example and without limitation, a trim piece that is configured to be positioned at a junction between two flat materials (e.g., a junction between a flooring material and a wall). The system 10 can comprise a conveyor 14 that is configured to move the substrate 12 along a substrate movement axis 16. At least one print head array 20 can be positioned proximate to the conveyor 14 to print on the substrate 12 while the substrate is positioned on the conveyor.

Each print head array 20 can comprise a plurality of print heads 22. In some aspects, the print head arrays 22 can be configured to print as the substrate 12 moves thereby (e.g., when the location of the substrate along the substrate movement axis 16 matches, substantially matches, or overlaps with a location of the print head arrays along the substrate movement axis). Each print head 22 can be oriented to dispense ink (or other fluid) along an orientation axis 24. That is, the ink (or other fluid) can be deposited from the respective print head 22 to the substrate 12 along the orientation axis 24. The plurality of print heads 22 can comprise at least a first print head 22*a* and a second print head 22*b*. The orientation axis 24 of the first print head 22*a* can be angularly offset from the orientation axis 24 of the second print head 22*b* about the substrate movement axis 16. For example, the orientation axis 24 of each print head 22 can have an angular orientation relative to a reference direction 18 (e.g., a downward reference direction) within a transverse plane that extends through said print head, wherein the respective reference directions 18 in each transverse plane are parallel. In exemplary aspects, the first print head 22*a* can have a first angular offset relative to the reference direction (e.g., zero degrees in the illustrated exemplary embodiment). The second print head 22*b* can have a second angular offset θ2 relative the reference direction. In this example, the angular offset between the first and second print heads 22*a,b* can be the difference between the first angular offset relative to the reference direction (zero degrees) and the second angular offset relative to the reference direction (θ2). In this example, said angular offset is θ2 minus zero, or θ2. The first print head 22*a* can further be axially offset from the second print head 22*b* along the substrate movement axis 16.

Optionally, the orientation axis of the first print head 22*a* can be angularly offset from the orientation axis of the second print head 22*b* by at least 10 degrees, at least 20 degrees, at least 30 degrees, at least 45 degrees, from about 10 degrees to about 180 degrees, or from about 30 degrees to about 100 degrees, or about 45 degrees or about 60 degrees. Optionally, it is contemplated that any two adjacent print heads (e.g., print heads that are configured to print on adjacent surfaces of the substrate) can be angularly offset by no more than 120 degrees. In one embodiment, the system 10 can be configured to control the substrate in exacting alignment with the print heads and make electronic adjustments to the printing area of the print heads so as to limit the overlap of printing.

Figure 3:
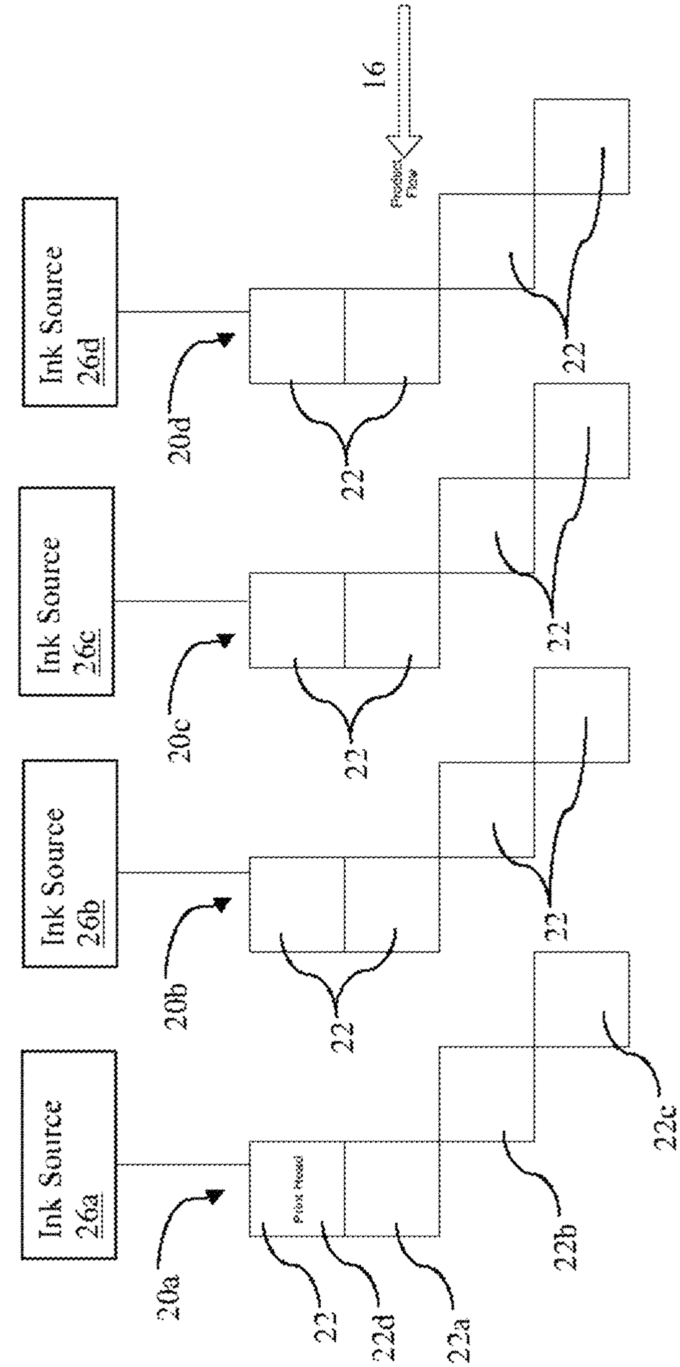
FIG. 3 is a schematic top view of a plurality of exemplary print head arrays as disclosed herein.
Figure 4:
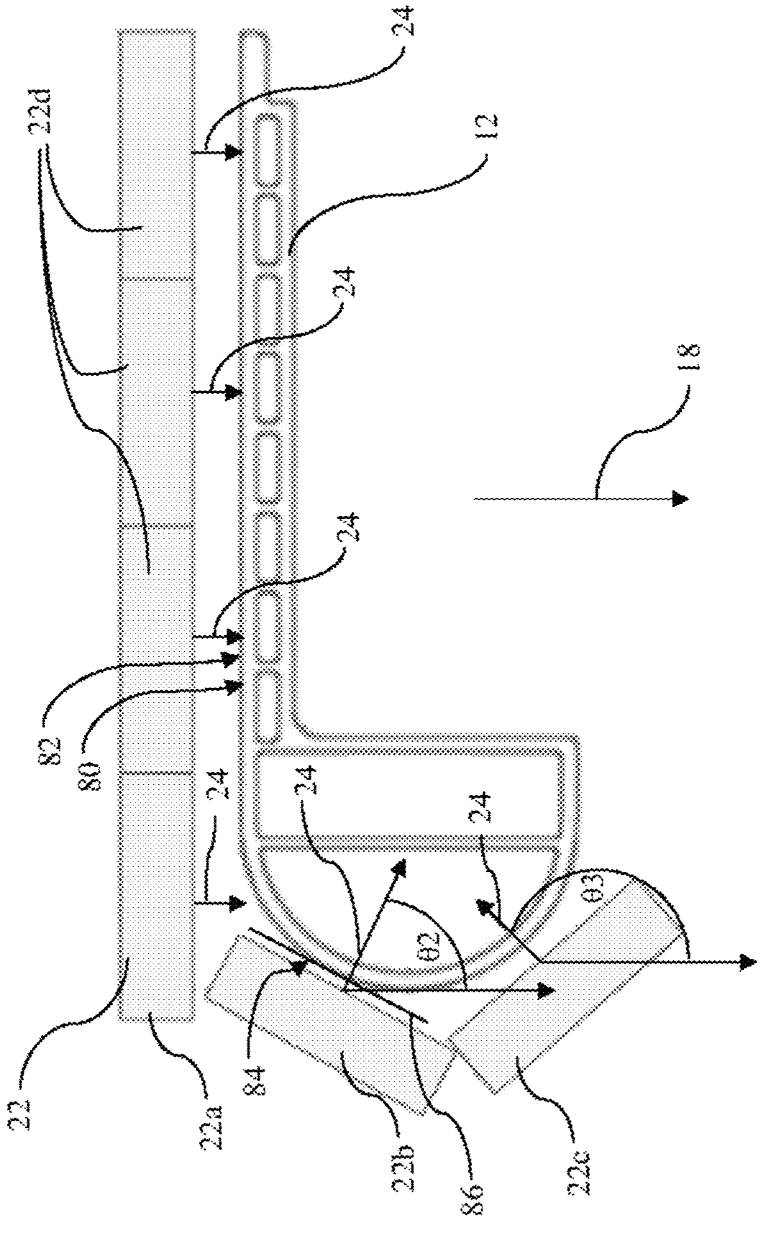
FIG. 4 is an end view of a substrate and a plurality of exemplary print heads of an exemplary print head array.

In some aspects, and with reference to FIGS. 3 and 4, one or more of the print head arrays 20 can comprise a third print head 22*c*. The orientation axis 24 of the third print head 22*c* can be angularly offset from the orientation axis 24 of the first print head 22*a* and the orientation axis 24 of the second print head 22*b*. For example, the third print head 22*c* can have a third angular offset θ3 relative to the reference direction. Thus, the angular offset between the orientation axes 24 of the first and third print heads 22*a*, 22*c* can be the difference between the first angular offset relative to the reference direction (zero degrees) and the third angular offset relative to the reference direction, or θ3. Likewise, the angular offset between the second and third print heads 22*b,c* can be the difference between the second angular offset relative to the reference direction (θ2) and the third angular offset relative to the reference direction (θ3), or θ3 minus θ2. The third print head 22*c* can be axially offset from each of the first print head 22*a* and the second print head 22*b* along the substrate movement axis 16.

In further aspects, one or more of the print head arrays 20 can comprise one or more print heads 22*d* that have a respective orientation axis that is parallel (or within 15 degrees, within 10 degrees, within 5 degrees, or within 1 degree of parallel) to the orientation axis 24 of the first print head 22*a*. Optionally, the one or more print heads 22*d* can be axially aligned with (i.e., not axially offset from) the first print head 22*a* along the substrate movement axis 16.

Accordingly, in some aspects and as shown in FIG. 4, a plurality of print heads (the first print head 22*a* and the print heads 22*d*) can all have parallel orientation axes 24 (or axes 24 that are within 15 degrees, within 10 degrees, within 5 degrees, or within 1 degree of parallel) so that said print heads dispense in the same direction (e.g., downwardly). In this way, the first print head 22*a* and the print heads 22*d* can print on the flat top portion of the substrate 12. The second print head 22*b* can print downwardly (at an angle relative to a horizontal plane) on the top portion of the convex curve of the substrate 12. The third print head 22*c* can (facing upwardly and at an angle relative to the horizontal plane) print upwardly on the bottom portion of the convex curve of the substrate 12.

In further aspects, any number of print heads can be arranged, based on the size and curvature of the substrate, in any suitable arrangement to print over a printing surface of the substrate. That is, it is contemplated that, in use, the surface of a substrate such as a trim piece can have a portion that is configured for viewing, and a portion of the surface can be positioned against or hidden by another surface so that it is not viewable. Accordingly, in some optional aspects, at least the portion of the surface that is configured for viewing can form the printing surface. Thus, the system can be configured to print, in one pass of the substrate 12 through the system 10, on the entire printing surface of the substrate. For example, the substrate can be a stair nose (as shown in FIG. 4). The lower surface that attaches to the stair below can be hidden, and does not need to be printed on for aesthetic purposes, whereas the upper surface and the convex curve can be configured for viewing and, thus, can form the portion of the surface that is configured for viewing.

In some aspects, the system 10 can comprise a plurality of print head arrays 20. Each print head array can be axially offset from each other print head array 20 along the substrate movement axis 16. In some aspects, each print head arrays 20 can be configured to print a respective color. For example, the plurality of print head arrays 20 can comprise a first print head array 20*a* that is configured to print black ink, a second print head array 20*b* that is configured to print cyan ink, a third print head array 20*c* that is configured to print yellow ink, and a fourth print head array 20*d* that is configured to print magenta ink. In further aspects, other colors can be used based on the desired output. For example, an orange ink can be used to print colors such as deep red. In further aspects, the ink colors can comprise light magenta, light black, or grey ink. Although exemplary configurations of the print head arrays are described and disclosed herein, it is contemplated that any desired number of print head arrays, and any desired sequence of ink (associated with sequentially positioned print head arrays) can be employed within the disclosed systems and methods.

Each print head 22 can comprise a plurality of nozzles that are configured to be controlled (e.g., independently controlled) to selectively dispense ink. Exemplary print heads can be FUJI DIMATIX inkjet print heads, XAAR print heads, SEIKO print heads, KYOCERA print heads, RICOH print heads, or KONICA MINOLTA print heads. In some optional aspects, the print heads can have firing modes of binary and/or grayscale jetting.

As used herein, ink can be defined as understood within the digital printing industry. Accordingly, in various optional aspects, the ink can comprise solvent, oil, aqueous ink and/or UV-curable ink.

A respective ink source can be in communication with each print head array 20. For example, a first ink source 26*a* can be in communication with the first print head array 20*a*, a second ink source 26*b* can be in communication with the second print head array 20*b*, a third ink source 26*c* can be in communication with the third print head array 20*c*, and a fourth ink source 26*d* can be in communication with the fourth print head array 20*d*.

The system 10 can further comprise a primer dispenser 30 that is configured to dispense a primer. The primer dispenser 30 can spray or pad coat the substrate. In further aspects, the system can comprise a priming device that is configured to surface-treat the substrate 12. For example, the priming device can be configured to apply plasma, flame, or corona treatment to alter the surface energy of the substrate (e.g., for enhancing adhesion of the ink).

In some aspects, the print heads 22 can be configured to print on a curved surface. For example, the print head can be configured to print on surface having a radius that is less than 25 mm or less than 20 mm or less than 10 mm or less than 5 mm, or at least 10 mm or at least 20 mm or at least 30 mm. In some aspects, print heads 22 can be positioned relative to the conveyor such that the substrate 12 can be no further than 5 mm away from the print head 22. In further aspects, the print head 22 can have certain nozzles that are beyond a maximum distance (e.g., 5 mm) from the substrate 12 inactivated so that only nozzles within the maximum distance are used. For example, with reference to FIG. 4, it is contemplated that if the distance of a certain nozzle is beyond the maximum distance from the substrate, then the nozzle can be restricted from jetting ink. In some aspects, the nozzles can be manually activated or inactivated based on user input. In further aspects, the nozzles can be activated or inactivated as a function of nozzle-to-substrate distance calculated by a computing device, as further described herein. This proximity can limit the overall radius of substrate to properly jet the ink and maintain alignment. For example, this proximity can limit the area across which the print head prints on the substrate, allowing the print head to maintain proper alignment with the limited area of the substrate (as opposed to a larger area across which the print head cannot print with sufficient quality). In exemplary aspects, the print heads can be in fixed locations perpendicular to a linear axis of the substrate passing by the print head. Optionally, the print heads can be adjusted to maintain the proper distance from the substrate to ensure the maximum distance is appropriate for the substrate being printed. For example, the print heads can be mounted to a mounting structure that enables angular and/or linear movement relative to the substrate. Optionally, the mounting structure can comprise tracks along which the print heads can slide and then can be locked into place with a clamp, threaded fastener, or other locking device. Optionally, the mounting structure can comprise at least one pivotal joint that is selectively lockable and releasable (e.g., with a clamp, threaded fastener, or other locking device) to adjust angular positon of the print heads relative to the substrate. The overall lateral alignment for proper jetting (e.g., distance from the substrate and orientation of the orientation axis) can, in some optional aspects, be performed by an operator making adjustments to keep proximity between the print heads and the substrate. In further optional aspects, the operator can make electronic adjustments for the purpose of turning on or off jet nozzles that would otherwise create lines on the substrate (e.g., by adjacent print heads printing on top of each other or leaving a gap between surfaces printed by adjacent heads). In some examples, the precision control (e.g., print head positioning and/or nozzle usage) can be automated using a computer.

Figure 10:
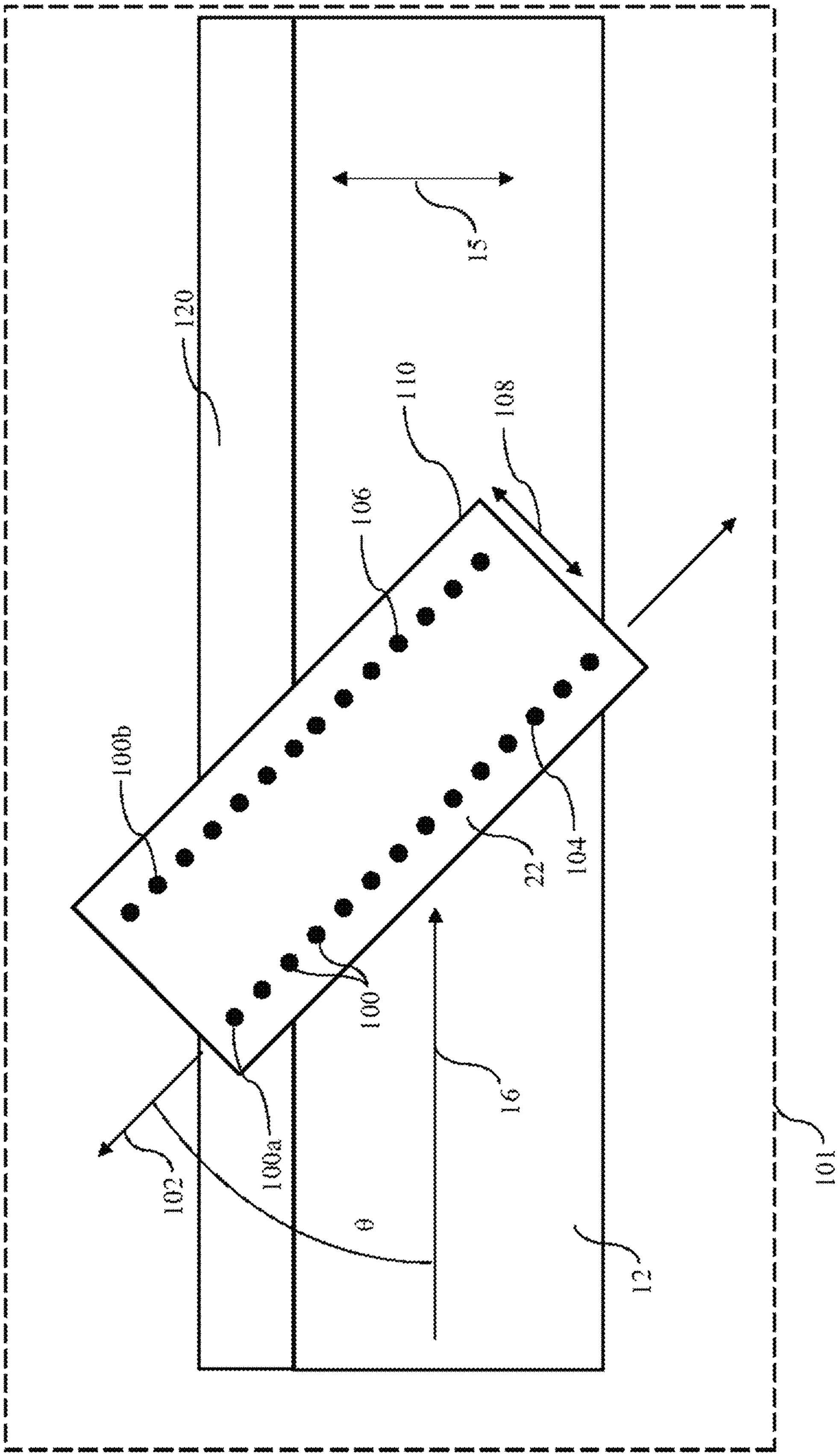
FIG. 10 is a schematic diagram of an exemplary print head that is oriented at an acute angle relative to the substrate movement axis.
Figure 11:
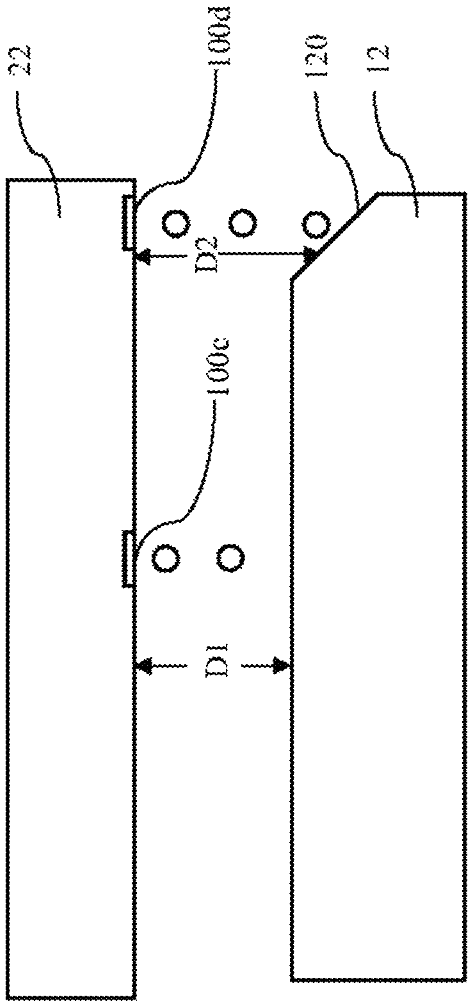
FIG. 11 is a cross-sectional schematic view of the exemplary print head of FIG. 10 taken in a plane perpendicular to the substrate movement axis.

Referring to FIGS. 10 and 11, each print head 22 can have a plurality of nozzles 100. In some aspects, the time of flight of ink droplets can be accounted for so that nozzles that are farther away from the substrate can be actuated sooner (e.g., a few milliseconds earlier) than nozzles that are closer to the substrate to provide an earlier departure time for the droplets travelling farther so that the droplets arrive at the same time. It is contemplated that accounting for droplet time of flight can enable use of nozzles that are greater than 5 mm away from the substrate. For example, referring to FIG. 11, illustrating a cross-section of a print head and a substrate, it is contemplated that a first nozzle 100*c* positioned above the substrate that is a first distance, D1, away from the substrate can deposit ink at a time that is different from (earlier than) a second nozzle 100*d* that is positioned above the substrate that is a second (greater) distance, D2, away from the substrate.

Figure 12:
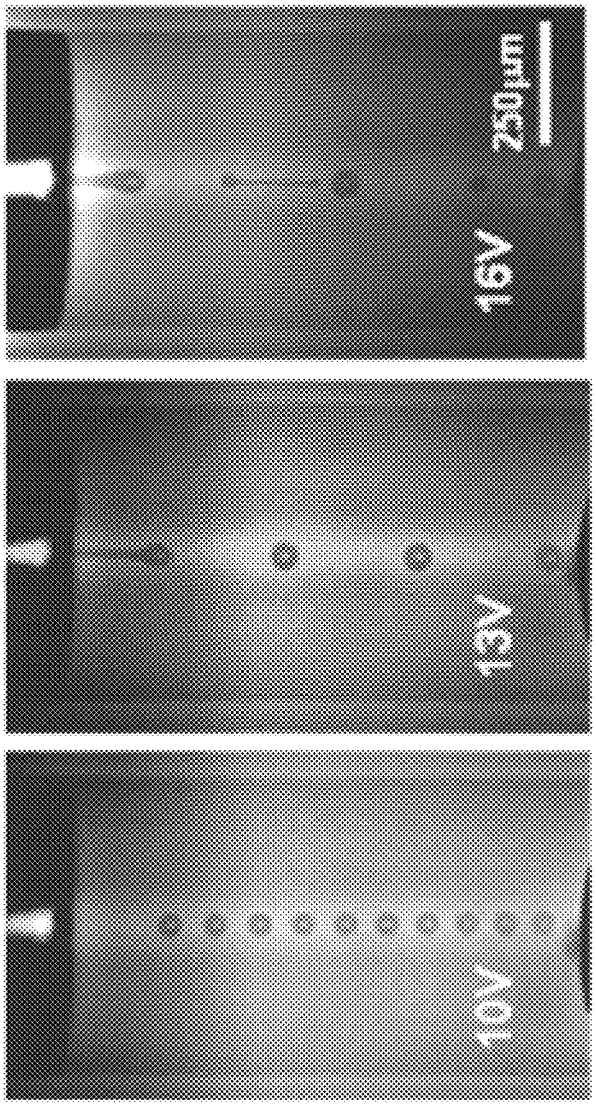
FIG. 12 illustrates deposition of ink droplets from an exemplary print head at different electric potentials.

A computing device can be configured to at least partially determine the nozzle timing. For example, the computing device can determine a distance between each nozzle and the substrate. Optionally, each distance can be a user input. In further aspects, the distance can be calculated based on a geometry of the substrate (e.g., a line, a curve, or a complex shape) and an orientation of the print head relative to the input geometry of the substrate. The geometry of the substrate can be received by the computing device via, for example, user-input or an optical scan. Further, the computing device can receive a speed of substrate movement to determine the time at which the nozzle should actuate to deposit the ink at a particular location along the substrate. The computing device can still further be configured to determine the timing of each nozzle based on the voltage applied. For example, the printer can be configured to deposit at a different rate based on the voltage applied (see FIG. 12), and the computing device can account for the voltage applied at the nozzle. Thus, the computing device can be configured to determine the actuation time for each nozzle based on distance from the nozzle to the substrate, movement speed of the substrate, and droplet velocity from the nozzle to the substrate.

The print heads 22 can be configured to print on a printing area of the substrate as the substrate passes by the print head 22. In some aspects, during printing, the printing area of the substrate is positioned no greater than a predetermined distance from the print head. Accordingly in aspects in which the print head is configured to print on a curved surface, portions of the printing area can be closer and farther away from the print head than other portions of the printing area, but no portion of the printing area is spaced away from the print head by a distance greater than the predetermined distance. In some aspects, the predetermined distance is no greater than 10 mm, or no greater than 7 mm, or no greater than 5 mm, or no greater than 4 mm. The print heads 22 can be arranged so that adjacent print areas overlap or align so that no seam (within the finished, printed substrate) is visible therebetween. It is contemplated that individual nozzles of the print head can be selectively turned off to ensure proper alignment with no overlap or seam is visible between adjacent surfaces printed on by adjacent print heads.

The system can comprise an ultraviolet (UV) source 32 that is directed toward the substrate movement axis 16 to cure ink deposited by the print head array(s) 20. Such ultraviolet sources, which can include UV curing systems or UV LED curing systems as are known in the art, use energy from ultraviolet light to quickly cure ink applied on the substrate. An exemplary device is an SPDI UV TOTALCURE curing system. Another example is the MILTEC UV system.

The system 10 can further comprise a coating applicator 38 (e.g., a spray station). The coating applicator 38 can be configured to apply a coating. For example, in some aspects, the coating applicator can spray the coating. In further aspects, the coating applicator can apply the coating via pad coating or through the use of rollers. In some optional aspects, the coating can comprise polyurethane (e.g., UV-cured polyurethane. Optionally, the polyurethane coating can be provided, for example, by ALLNEX, SHERWIN-WILLIAMS, VALSPAR, PPG, R&D coatings, TECHNOS, KLUMPP, or AKZONOBEL. In further optional aspects, the coating can comprise acrylic. In further aspects, the UV coating can be applied via inkjet. For example, at least one print head can be configured to deposit the UV coating. In some exemplary aspects, it is contemplated that clear ink can be applied rather than pigmented ink. In these aspects, it is contemplated that the pigmented ink can be replaced with clear ink, and/or a separate array of print heads (in addition to an array of print heads that apply pigmented ink) can be used to create an overall texture. In some aspects, it is contemplated that the jetted clear ink can be embossed or built up to create a desired texture profile, which can optionally be in registration with a printed image.

In some optional aspects, the system 10 can comprise a particle dispenser 39 that is configured to dispense particles for wear improvement. For example, the particle dispenser 39 can be configured to dispense aluminum oxide particles, corundum particles, or other similar wear particles. In some aspects, the particles can have a size ranging from about 400 mesh (about 37 microns) to about 40 mesh (about 400 microns). For example, the particles can have a size from about 400 mesh to about 140 mesh (about 100 microns), from about 140 mesh to about 40 mesh, or from about 140 mesh to about 50 mesh (about 300 microns), or from about 400 mesh to about 100 mesh, or from about 100 mesh to about 40 mesh. In some aspects, the particle dispenser 39 can be downstream of the coating applicator 38 relative to a movement direction 17 of the substrate along the movement axis 16 (FIG. 1) so that each portion of the substrate passes the particle dispenser 39 before passing the coating applicator. The particle dispenser 39 can dispense particles onto the coating prior to UV curing. Accordingly, UV curing via the UV source 32 can affix the particles to the substrate 12 with the coating.

Figure 5:
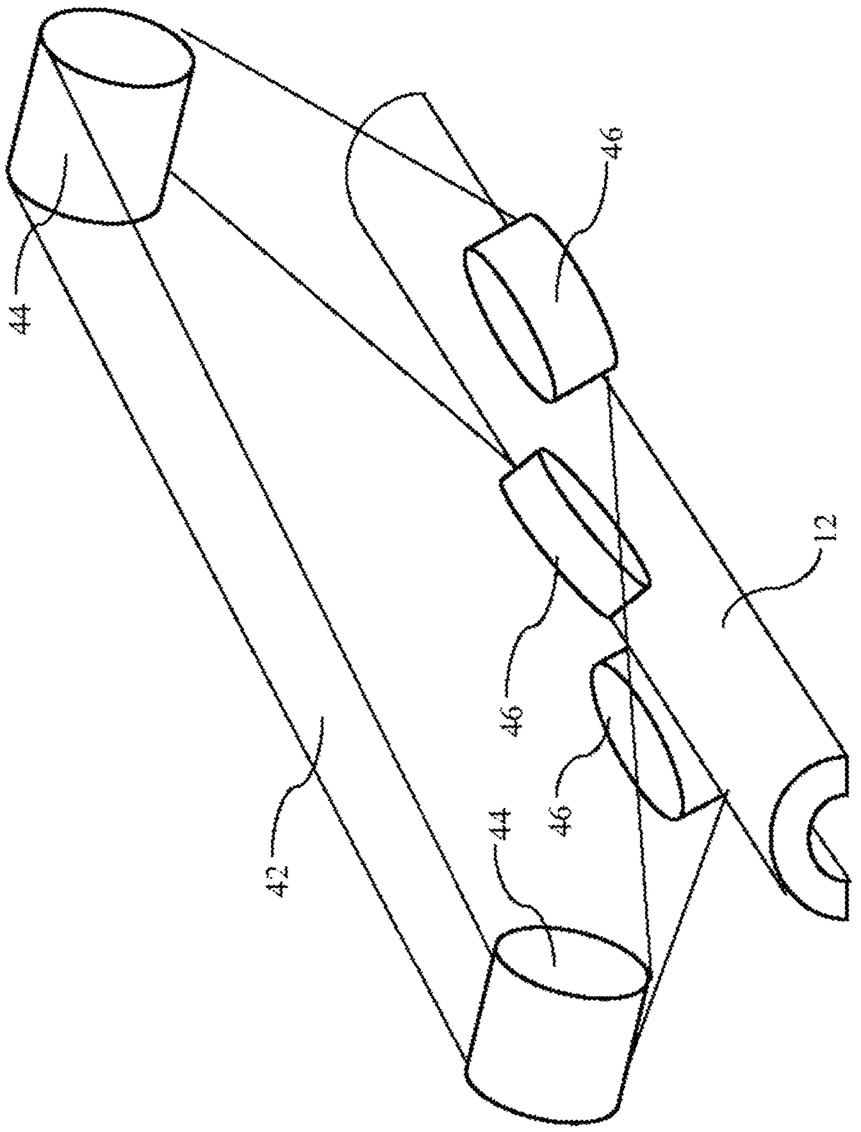
FIG. 5 is a schematic perspective view of an exemplary embossing assembly as disclosed herein.
Figure 6:
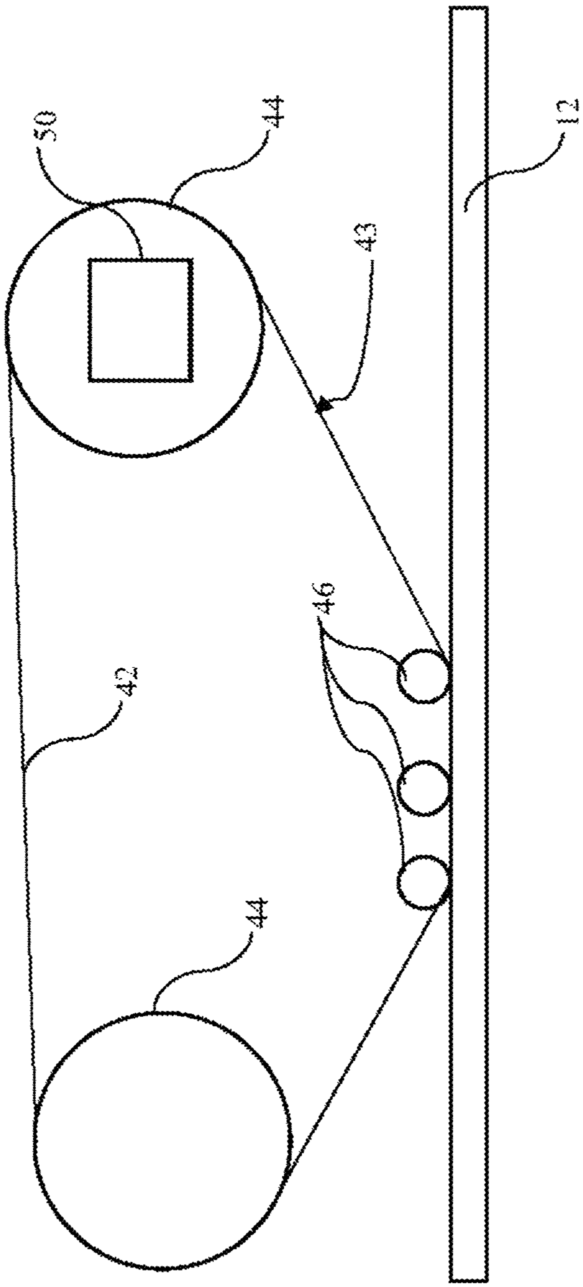
FIG. 6 is a schematic side view of the exemplary embossing assembly of FIG. 5.
Figure 7:
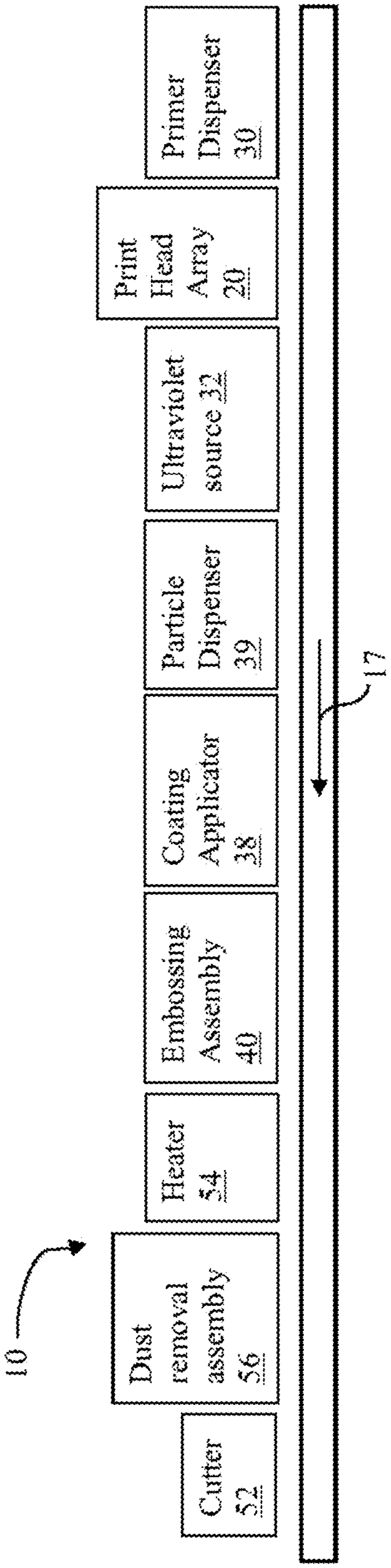
FIG. 7 is a schematic diagram of another exemplary system as disclosed herein.

Referring also to FIGS. 5-6, the system 10 can comprise an embossing assembly 40. Optionally, the embossing assembly 40 can be configured to emboss the coating applied by the coating applicator 38. For example, the coating can be uncured or only partially cured (e.g., in a b-stage), thereby allowing the coating to be formable and then fully cured later. The embossing assembly 40 can comprise a flexible band 42 or other material that extends about (and is coupled to) at least two rollers 44. The flexible band 42 can be formed into a loop. In some optional aspects, at least a portion of the flexible band 42 can extend parallel (or within 15 degrees, within 10 degrees, within 5 degrees, or within 1 degree of parallel) to the substrate movement axis 16. The flexible band 42 can have an embossing surface 43 that defines a positive (e.g., projecting) profile that, when applied to the substrate, leaves a negative (e.g., recessed) imprint on the substrate. Optionally, an embossing motor 50 can be configured to rotate at least one of the rollers 44 to cause the flexible band 42 to have the same linear travel rate as the substrate 12 along the substrate movement axis 16. In further aspects, the embossing motor 50 can be omitted, and friction between the flexible band 42 and the substrate can cause each to have the same linear travel rate along the substrate movement axis. One or more press rollers 46 can bias the flexible band 42 against the surface of the substrate. It is contemplated that the flexible band 42 can be configured to wrap around the substrate to simultaneously emboss along an entire cross section of the substrate. Optionally, the press rollers 46 can cause the flexible band 42 to press the flexible band 42 against the entire cross section of the substrate. Accordingly, the press rollers 46 can be axially offset from each other along a transverse axis 15 that is transverse (optionally, perpendicular or within 15 degrees, 10 degrees, 5 degrees, or 1 degree of perpendicular) to the substrate movement axis 16. The press rollers 46 can further be axially offset from each other along the substrate movement axis. In yet further aspects, the rollers 46 can rotate about respective rotational axes, wherein the rotational axes can be parallel or angled with respect to each other. Optionally, the press rollers 46 can each have an outer circumferential surface that is complementary to the surface of the substrate against which the press roller biases the flexible band 42. Accordingly, for example, at least one press roller 46 can have a concave surface to bias the flexible band 42 against a convex surface of the substrate. Similarly, in some aspects, at least one press roller 46 can have a convex surface to bias the flexible band 42 against a concave surface of the substrate. Optionally, a system can omit any print heads (or the print heads can remain inactive). Thus, in some optional aspects, the system can be used for providing an embossed substrate without any printed pattern on said embossed substrate. Thus, for example, an unprinted white substrate can remain white as a finished good.

In some aspects, the plurality of print head arrays 20 can be configured to print ink (e.g., optionally, clear getable ink) that has a thickness. The plurality of print head arrays 20 can apply stacked layers of ink to form a structured build-up of ink that defines a desired profile. In this way, for example, an aesthetic texture (e.g., a texture of wood grain), a functional texture (e.g., a texture to improve grip, such as a non-slip texture), or other desired texture can be printed. In some aspects, the texture or other desired profile can further comprise color printing. For example, the substrate can have both a wood grain texture and corresponding wood grain color printed thereon. Thus, the texture can be in register with the printed pattern.

In some optional aspects, the system 10 can comprise a material cutter 52. The material cutter can be configured to cut the substrate to a predetermined length. In exemplary aspects, the cutter 52 can be positioned downstream of the remaining components of system 10. In this way, the cutter 52 can cut the substrate to the predetermined length (and other dimensions) after the printing process has been completed.

In some optional aspects, the system 10 can comprise a heater 54. Optionally, the heater can be an infrared heater. The heater 54 can be configured to cure ink, coating, or any material deposited on the substrate 12. In exemplary aspects, the heater 54 can be positioned downstream of the UV source 32, the coating applicator 38, and the embossing assembly 40 (when provided).

In some optional aspects, the system 10 can comprise a dust removal assembly 56. The dust removal assembly 56 can comprise, for example, a brush, a spray nozzle, a compressed air source, or a combination thereof. In exemplary aspects, the dust removal assembly 56 can be positioned upstream of the cutter 52.

The system 10 can be configured to print on various substrates 12. For example, in some aspects, the substrate 12 is a stair nose. In further aspects, the substrate can be decking, wall molding, trim, or a furniture component. In various optional aspects, the substrate 12 can comprise, for example, polyvinyl chloride (PVC), polystyrene, polyethylene terephthalate (PET), acrylonitrile butadiene styrene (ABS), high-density fiberboard (HDF), medium-density fiberboard (MDF), or aluminum, or a combination thereof. In some aspects, the substrate can comprise a core (e.g., a material that can be coated and/or printed on and/or embossed). In exemplary aspects, the core can comprise extruded material, such as PVC, polystyrene, ABS, PET, polyethylene terephthalate glycol (PETG), polyvinyl alcohol (PVA), polylactic acid (PLA), or a combination thereof. In exemplary aspects, the core material can be a milled/machined material, such as, for example, HDF, MDF, or wood. In yet further aspects, the core can comprise one or more composite materials. The composite material can comprise, for example, polymer and organic and/or inorganic filler. In further aspects, the substrate can comprise a core (e.g., comprising HDF or MDF) and an outer layer that defines a surface suitable for printing. For example, the outer layer can comprise a film or other polymer layer (optionally, that is wrapped around and/or glued to the core). The film or other polymer layer can comprise, for example, PP, PET, ABS, or PETG. In yet further aspects, the core material can comprise a primer coating. In this way, rough or porous core materials can be adapted to have surfaces for printing.

Figure 2:
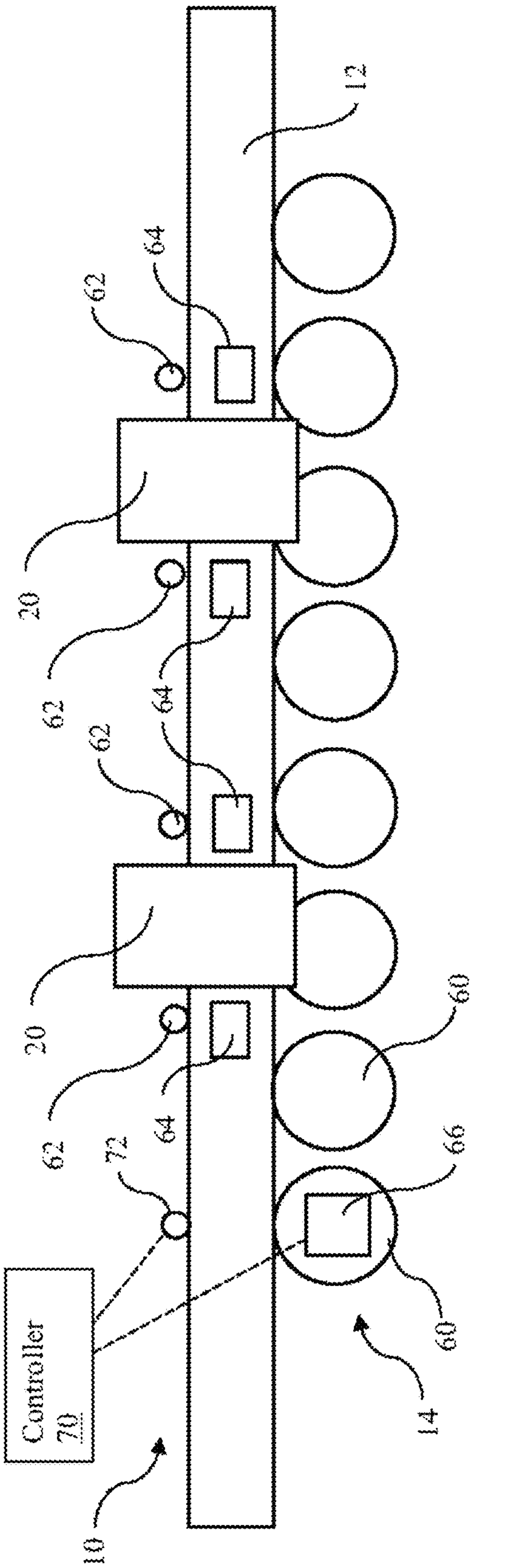
FIG. 2 is a side schematic diagram of the exemplary system for printing of FIG. 1.

In some aspects, as shown in FIG. 2, the conveyor 14 can comprise a plurality of transport wheels 60. In some optional aspects, each of the transport wheels 60 can be embodied as an elongate roller. At least one transport wheel 60 of the plurality of transport wheels can be coupled to a conveyor motor 66 to effect movement of the wheel, thereby causing movement of the substrate along the substrate movement axis 16. In further aspects, a linear drive chain can simultaneously move a plurality of the transport wheels 60. In yet further aspects, the conveyor 14 can comprise a belt or any suitable assembly for moving the substrate 12 along the substrate movement axis 16 in a controlled manner.

In some aspects, and as shown in FIGS. 1-2, the system 10 can comprise at least one guide wheel 62 that is configured to bias the substrate 12 toward the transport wheels 60. In further aspects, the system 10 can comprise opposing lateral guide wheels 64 that are configured to bias the substrate 12 toward each other to position the substrate along the transverse axis 15.

The system 10 can be configured to determine movement of the substrate 12 along the substrate movement axis 16 (e.g., via a material position sensor). For example, as shown in FIG. 2, in some aspects, the conveyor motor 66 can be a stepper motor in communication with a controller 70. The controller 70 can comprise a memory and at least one processor, wherein the at least one processor is configured to determine linear movement of the substrate based on the rotation of the conveyor motor 66. Accordingly, the conveyor motor 66 can serve as a material position sensor. Additionally or alternatively, the system 10 can comprise an encoder 72 in communication with the controller 70. The encoder 72 can be configured to detect linear movement of the substrate. The controller 70 can receive feedback from the encoder to determine linear movement of the substrate 12. Thus, the encoder 72 can serve as a material position sensor. The controller 70 can further be configured to coordinate printing of each print head 22 of the plurality of print heads of each of the print head arrays 20. A defined printer calibration sequence can be performed to calibrate the print head. An operator can, via a calibration routine that can optionally be guided by a computing device, adjust speed of the substrate and/or timing of the deposition of the nozzles of the print heads (optionally, as a function of the distance of the nozzles from the substrate) to set timing of jetting of ink for optimal results.

Referring to FIG. 4, a method can comprise moving the substrate 12 along the substrate movement axis 16. The substrate 12 can have a surface 80 (e.g., an outer surface) having a first portion 82 and a second portion 84, wherein the first portion 82 or a plane tangential thereto is angularly offset from the second portion or a plane tangential thereto (e.g., a plane 86). The method can further comprise printing on the first portion 82 and the second portion 84 of the surface 80 of the substrate 12 during a single pass of the substrate along the substrate movement axis 16. In further aspects, all of the print heads can print during a single pass of the substrate along the movement axis.

In some aspects, printing on the first portion and the second portion of the surface of the substrate can comprise printing with at least one print head array having a plurality of print heads, wherein the plurality of print heads comprises at least a first print head and a second print head. The orientation axis of the first print head can be angularly offset from the orientation axis of the second print head about the substrate movement axis. The first print head can further be offset from the second print head along the substrate movement axis.

In some aspects, printing on the first and second portions 82, 84 can be performed simultaneously during at least a portion of the printing process. For example, the first and second print heads can be axially offset along the substrate movement axis 16, and the first and second portions 82, 84, therefore, can likewise be axially offset. Accordingly, the leading end of the substrate will arrive at one of the first and second print heads before the other. Thus, one of the print heads can begin printing on the substrate before the other, and then, once the substrate positioned at both the first and second print heads, both the first and second print heads can, optionally, simultaneously print on the substrate. In further aspects in which the print head array 20 comprises three or more print heads (e.g., the third print head 22*c* and/or print heads 22*d*) all of the print heads 22 can print on the substrate as the substrate passes thereby, optionally, simultaneously print with all of the other print heads of the same print head array 20 and/or the print heads of other print head arrays.

In some of the example embodiments described herein, the print head array 20 and the print heads 22 can remain static as the substrate 12 moves along the conveyer 14. However, in further example embodiments, it is envisioned that the print head arrays 20 and/or the print heads 22 can be repositioned automatically (computer controller/robotic) or manually to adjust to the shape and orientation of the substrate on which the print head array 20 and the print heads 22 are to print. That is, for a first print job on a first substrate, the print head arrays 20 and the print heads 22 can be arranged in a first pattern, and for a second print job on second substrate, the print head arrays 20 and print heads 22 can be repositioned if the shape and orientation of the second substrate is different from that of the first substrate. The print head arrays 20 and print heads 22 can be configured to be individually repositionable. Further, the print head arrays and the print heads (20, 22) may be repositionable along any appropriate axis without departing from a broader scope of the present disclosure. Optionally, an intelligent imaging system (e.g., controller coupled to an imaging device or image sensor) can be used to determine the shape and orientation of the substrate and communicate with a control system that is configured to adjust the position of the print head array 20 and the respective print heads 22 based on the shape and orientation of the incoming substrate and/or the image/pattern that is to be printed thereon. Additionally, the embossing assembly 40, the flexible band 42 and the rollers 44 may also be adjustable based on the shape and orientation of the substrate.

Unlike rigid boards, trim pieces can be flexible and, therefore, in some circumstances, need to be held in position accurately to digitally print thereon with precision, i.e., such that the resulting printed trim pieces are visually appealing (e.g., without white line seams, overlaps, etc.). As such, typical mechanisms used to hold a substrate on the conveyor such as by using suction or clamping may not be ideal when the substrate is a trim piece because the suction may cause the substrate to flex, thereby affecting the printing with the print head arrays and print heads held static. In some examples such as the one described above, the print head arrays 20 and print heads 22 can be configured to adjust and be repositioned to compensate for any change in the shapes of the substrate resulting from the conveyance and holding mechanisms. In some example embodiments, traditional conveyor mechanisms including suction can be used to hold the substrate in place, and the mechanism can be modified to ensure that the substrates are not distorted. For example, suction can be used in conjunction with guide rails, and the suction pressure can be reduced from traditional pressures to hold the substrate in place without causing the substrate to flex. Other traditional methods have held trim pieces using fixtures with a clamping system to secure the pieces in a straight line. Such systems use a shuttle type approach where the device holding the material transports the piece under the print heads and then the clamping system recoils and returns to its original position for the loading of another trim piece. The system 10 described herein allows for a single pass system for hold-downs with no traditional clamping or returning of the fixture for reloading.

In addition to or as an alternative to directly printing on the substrate, it is contemplated that a print head array 20 can be configured to print ink on intermediate media that then transfers the ink to the substrate. It is contemplated that first printing on intermediate media can enable printing onto surfaces having geometry that is difficult to print onto directly.

Figure 8:
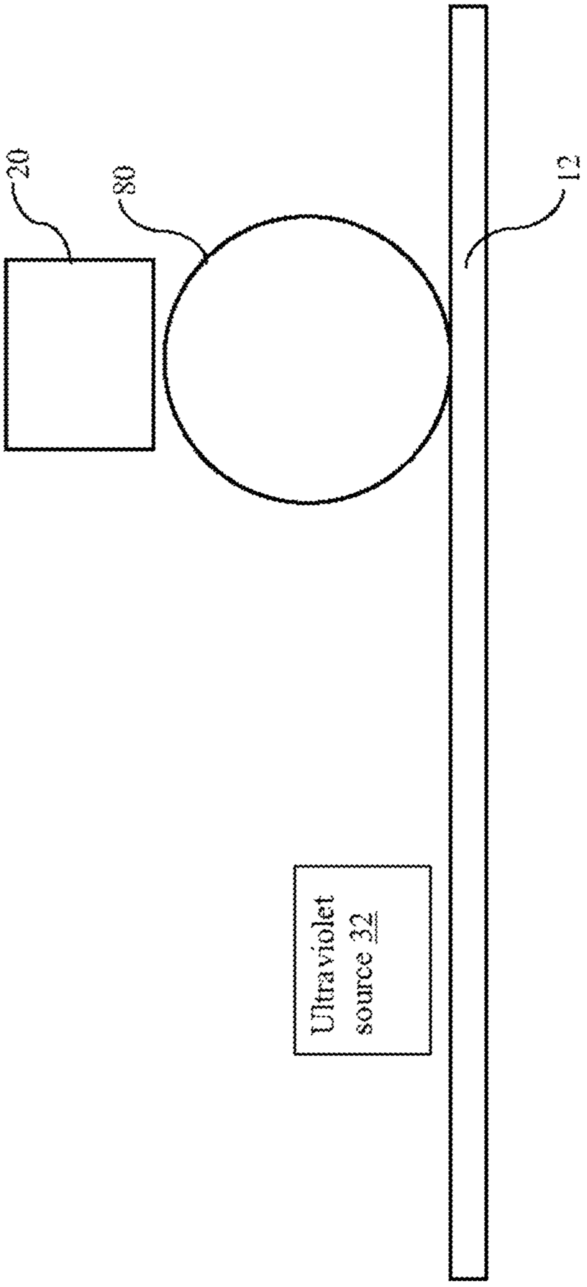
FIG. 8 is a schematic diagram of an exemplary printing assembly comprising a roller that is configured to transfer ink from a print head to the substrate.

For example, referring to FIG. 8 the print head array 20 can be configured to print ink onto a roller 80. The ink can be rolled onto the substrate. The roller 80 can have a shore hardness selected for conforming to the surface of the substrate. In some optional aspects, the roller 80 can have a hardness of Shore 00 0-100, Shore 00 0-50, Shore 00 50-100, or Shore 00 In some optional aspects, the roller 80 can have a hardness of Shore A 0-100, Shore A 0-Shore A 50-100, or Shore A 20-80. The ink can be cured after application to the substrate. For example, a UV source 32 can be positioned along the substrate movement axis 16 after the ink is applied to the substrate by the roller 80.

Figure 9:
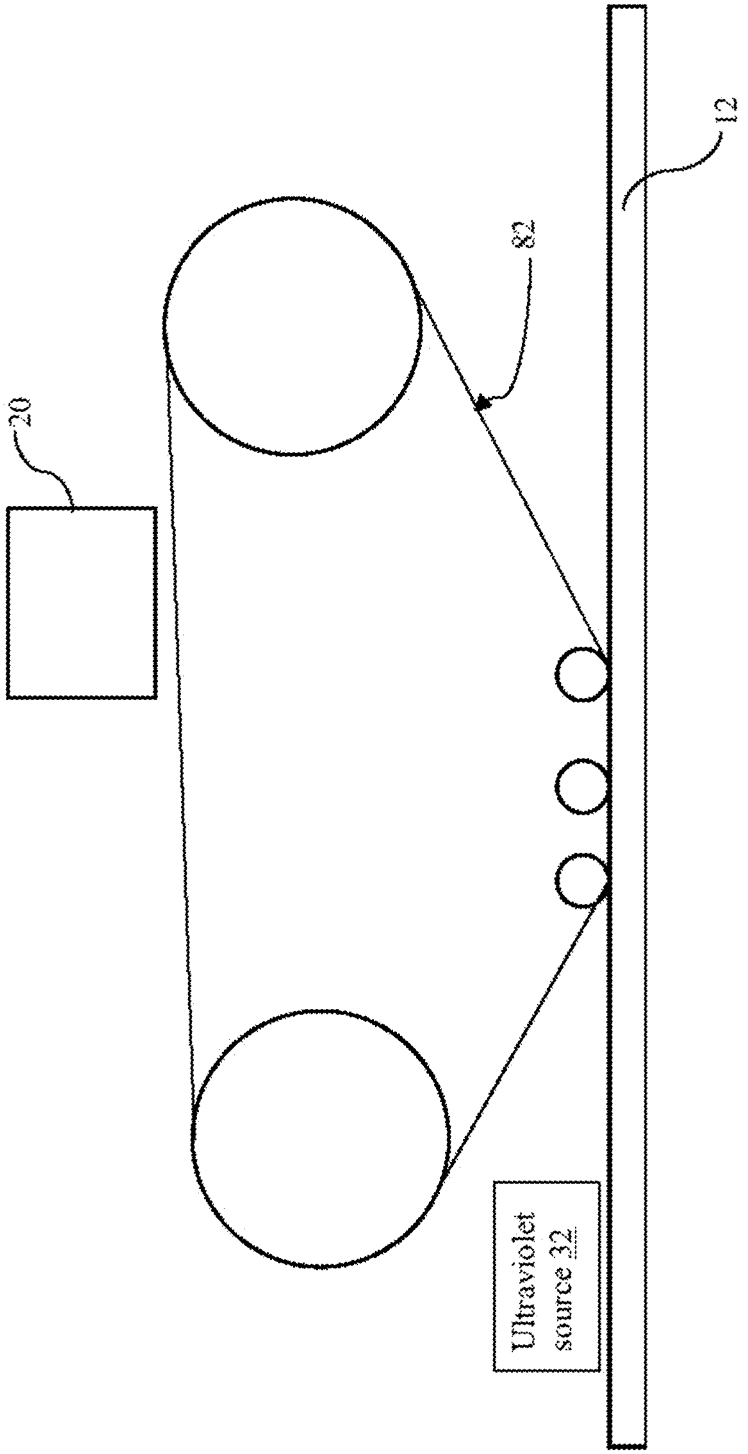
FIG. 9 is a schematic diagram of an exemplary printing assembly comprising a belt that is configured to transfer ink from a print head to the substrate.

Referring to FIG. 9, in further aspects, the print head array 20 can be configured to print on a flexible band 82. The flexible band 82 can then bias against the substrate to transfer the ink. The ink can be cured after application to the substrate. For example, a UV source 32 can be positioned along the substrate movement axis 16 after the ink is applied to the substrate by the flexible band 82. In further aspects, the UV source 32 can be configured to emit UV radiation through the band and cure the ink prior to withdrawing the flexible band 82 from the surface of the substrate. The flexible band 82 can comprise a material to which the UV ink does not permanently adhere (or otherwise stick) so that the UV ink transfers to the substrate. That is, the UV ink non-permanently adheres to the flexible band to allow transport and transfer of the UV ink from the print head to the substrate. In further aspects, the flexible band 82 can be a disposable material so that ink that remains adhered to the flexible band can be disposed of with the flexible band.

Referring to FIG. 10, in some aspects, at least one print head 22 of at least one print head array 20 (FIG. 1) can have a first plurality of nozzles 100*a* that are spaced along a respective row axis 102 of the print head array. In some optional aspects, the respective nozzle row axis 102 of at least one print head 22 of the print head array 20 can be oriented at an acute angle θ relative to the substrate movement axis 16. That is, the row axis 102 of said at least one print head 22, when projected into a plane 101 that includes the substrate movement axis 16, can intersect the substrate movement axis 16 at said acute angle θ. In this way, the arrangement of said print head 22 can provide a greater linear density of the first plurality of nozzles 100*a* along the transverse axis 15 than if the row axis 102 is oriented perpendicularly to the substrate movement axis.

Optionally, the row axis 102 of each print head of a given print head array 20 can be oriented at the acute angle θ relative to the substrate movement axis 16. In further aspects, the respective row axes 102 of at least two print heads 22 can be oriented at different acute angles relative to the substrate movement axis 16. Optionally, each print head array 20 (FIG. 1) can comprise at least one print head 22 (or, optionally, each print head of each array) that is oriented at an acute angle θ relative to the substrate movement axis.

In various optional aspects, the acute angle θ can be from about 20 degrees to about degrees, from about 30 degrees to about 60 degrees, or about 45 degrees. It can be understood that decreasing the acute angle θ can increase the linear density of the first plurality of nozzles 100*a* along the transverse axis. For example, for a print head 22 having 360 nozzles per inch, oriented at a 45 degree angle relative to the substrate movement axis 16, the plurality of nozzles have a linear density of about 500 nozzles per inch along the transverse axis (about a 40% increase). Accordingly, this arrangement can increase resolution of the print head. Because the linear density of the nozzles is increased, it is contemplated that the volume of ink that each nozzle deposits (e.g., per droplet or per inch substrate) can be reduced. For example, optionally, the volume of ink deposited per droplet can be decreased by the relative increase in linear density of nozzles due to orientation of the print head relative to the substrate movement axis.

In some aspects, the nozzle row axis 102 can intersect each nozzle 100 of the first plurality of nozzles 100*a*. Accordingly, all of the nozzles of the first row 104 can be arranged along a single line.

In some aspects, the print head 22 can be elongate along the row axis 102. For example, optionally, the print head 22 can have a housing 110 that is elongate along the row axis 102.

Optionally, all of the nozzles 100 of a given print head 22 can be aligned along a single row. That is, it is contemplated that the print head 22 can have a single row of nozzles 100 that are aligned in a row and spaced along the row axis 102.

In further aspects, the print head 22 can have multiple rows of nozzles 100, with each row having a respective nozzle row axis. For example, the first plurality of nozzles 100*a* of the print head 22 can be arranged in a first row 104, and a second plurality of nozzles 100*b* can be arranged in a second row 106. In some aspects, the first row 104 can be offset from the second row 106 along a second axis 108 that is perpendicular to the respective nozzle row axis. In yet further aspects, the plurality of nozzles can be arranged in any number of rows.

In exemplary aspects, the first plurality of nozzles 100*a* can have a nozzle density in the first row 104 of at least 300 nozzles per inch, at least 600 nozzles per inch, at least 800 nozzles per inch, or about 1000 nozzles per inch along the row axis. Accordingly, the nozzles can have a spacing between adjacent nozzles equal to the inverse of the nozzle density.

In optional aspects, the print head 22 can have a length from about ½ inch to about 4 inches. In further aspects, the print head can have a length of up to six feet (e.g., about 6 meters). The print head can optionally have a width from 1.7 inches to 4 inches. Optionally, the print heads can have housings that permit close positioning between nozzles of adjacent print heads. For example, the print head can have an angular face that is configured to mate with a corresponding angular face of an adjacent print head so that portions (e.g., margins) of the housing of each print head overlap each other to enable proximate positioning of nozzles from each head along an axis transverse to the axis of elongation of each housing. Such configurations are known in FUJIFILM DIMATIX print heads.

Figure 13B:
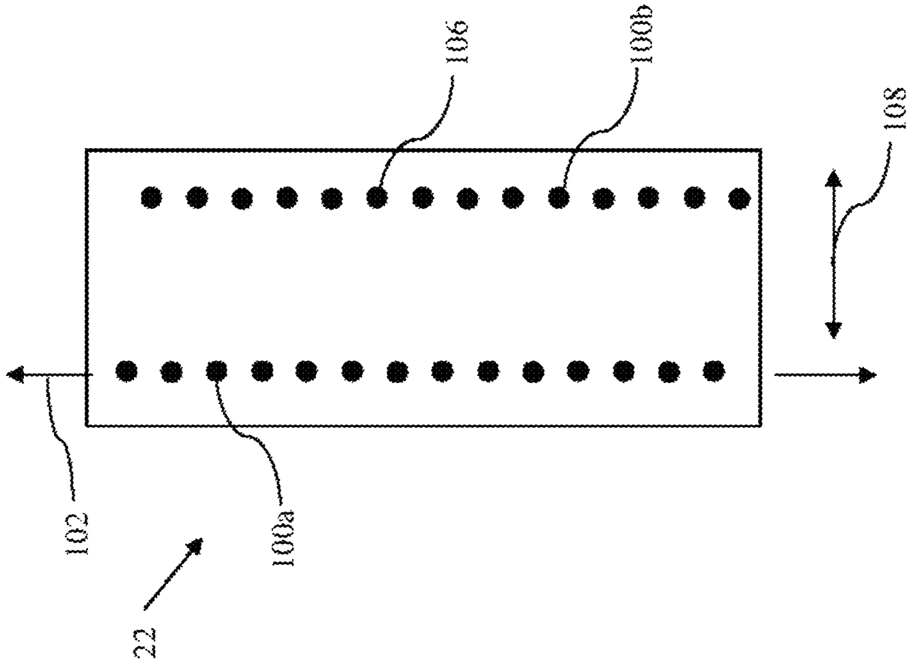
FIG. 13B is a schematic diagram of an exemplary second print head array having nozzles arranged in rows that are offset (staggered) relative to each other.
Figure 13A:
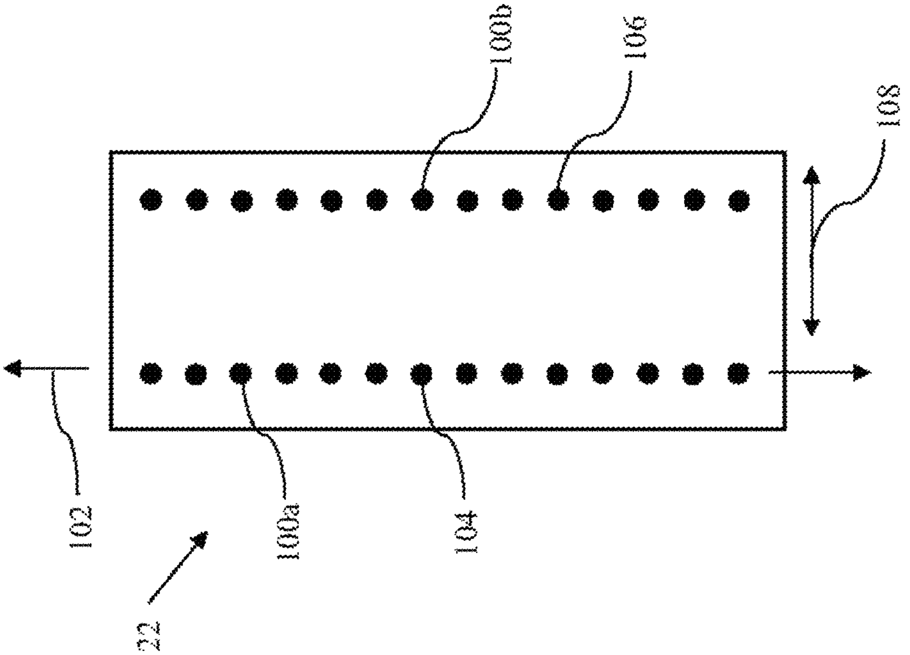
FIG. 13A is a schematic diagram of an exemplary first print head array having nozzles arranged in rows that are not offset from each other.

In some optional aspects, and as illustrated in FIG. 13A, respective nozzles 100 of the first row 104 and the second row 106 can be aligned along the second axis 108 (e.g., not staggered, so that a line parallel to the second axis extends through nozzles of both the first and second row). In further optional aspects, and as illustrated in FIG. 13B, the first row and second row can be staggered along the row axis 102 (e.g., by half of the spacing between adjacent nozzles of the first row).

Conventionally, high density inkjets use smaller quantity of volumes of ink per droplet, whereas larger nozzles use relatively more ink per droplet but provide decreased resolution. It is contemplated that the disclosed system with increased linear density of nozzles due to orientation of the print head 22 relative to the substrate movement axis 16 can advantageously have relatively high droplet volume as compared to a print head having the same linear density of nozzles that are oriented in a row that is perpendicular to the substrate movement axis and parallel to the transverse axis. In some optional aspects, the drop volume can be decreased as nozzle density increases in order to improve the printing resolution.

In some aspects, ink can be deposited as a cone of impact. That is, the nozzle (and nozzle opening) can be generally understood as a point, whereas the ink, once deposited on the substrate, covers an area that is greater than the opening at the nozzle. Printing characteristics (e.g., droplet size), droplet timing, etc. as well as surface characteristics (e.g., surface energy) can be adjusted for different products to achieve a particular cone of ink impact. For example, the surface energy can be altered by use of plasma, corona, or flame treatment. Further, chemical agents, such as primer, can aid in ink adhesion. The viscosity of the ink can be controlled and adjusted (e.g., by changing its temperature) based on the substrate properties and the desired look.

As should be understood, printing is conventionally performed in a downward orientation. Nozzles oriented aligned along an orientation axis 24 that is not downward (e.g., horizontal, upward, etc.) In some aspects, print heads can comprise an air purging system to maintain ink, rather than air, at the nozzles. This can be advantageous for print heads that are not oriented downward (e.g., in print heads that are angled) such that air, rather than ink, would otherwise collect at the nozzles.

It is contemplated that the increased nozzle density from the orientation of first plurality of nozzles of the print head array relative to the substrate movement axis can enable printing onto a bevel. Conventionally, bevels of substrates such as flooring planks have machined edges that can be visually unappealing. Accordingly, said bevels are painted a single color, often the same color as the rest of the flooring plank, since the difficulty of painting the bevel two or more colors is too difficult to do efficiently and consistently. Further, color changes for the systems painting the bevels can take a long time, and the colors on the bevel are typically inconsistent. Printing, using the systems and methods disclosed herein, can enable multi-colored or patterned bevels. Further, color changes can be done quickly, with no requirement to purge a previous color as is required for systems for painting the bevel.

In some aspects and with reference to FIGS. 10 and 11, the substrate can have a bevel 120. For example, the bevel 120 can be on a flooring plank. The bevel can have a width along the transverse axis 15 of less than 3 mm, or less than 2 mm, or about 1 mm wide. In some aspects, the substrate can move along the substrate movement axis 16 at above 20 meters per minute (e.g., about 35 meters per minute). By orienting the print head array 12 at an acute angle relative to the substrate movement axis 16, a greater number of nozzles can be positioned to print over the bevel, thereby increasing resolution and enabling deposition of relatively large volumes of ink across the bevel.

To compensate for the offset between nozzles 100 on opposed ends of the first row 104 along the substrate movement axis 16, a computing device that controls actuation of the nozzles can determine timing of actuation of the nozzles. For example, to print at a particular location of the substrate along the substrate movement axis, nozzles 100 at a leading end of the first row 104 (that the substrate passes by earlier) can deposit ink earlier than nozzles of the first row 104 at a trailing end. It is contemplated that the computing device can account for the relative position of each nozzle along the substrate movement axis to determine and control ink deposition timing.

It is noted that when the substrates described herein refer to trim pieces or transition pieces, in addition to linear/flat surfaces, the substrates may have intentionally formed curved surfaces such as convex or concave surfaces, or other complex non-linear or non-flat surfaces which are typically not conducive to or do not lend itself to being printed on by existing substrate printing technology because of the complex contours of the substrates. In some examples, the substrate may have at least one intentionally formed curved surface. In one example, the substrate may have more curved or non-linear surfaces than flat or linear surface. In another example, the substrate may have more or substantially same amount of flat or linear surfaces compared to curved or non-linear surfaces. In some examples the substrates could be stair treads with the stair nose having a curved surface.

In some aspects, the present disclosure describes an article comprising a substrate and a print layer comprising ink printed on the substrate to form an image. The image can be generated using print heads that are offset axially and offset along the movement axis. In some aspects, the image can be a decorative image. For example, the image can comprise a wood pattern, a stone pattern, an abstract image, or any other appropriate image. In some aspects, the image can be conducive for use of the article in combination with a surface covering article, such as a surface covering article for covering a wall, floor, or ceiling. The substrate can comprise have at least one intentionally formed curved surface. The substrate can be, for example, a trim or transition piece for use with surface covering articles. In one aspect, the ink can be directly printed on the top surface of the substrate, i.e., without any intermediary layers disposed above the substrate. In another aspect, the ink can be printed on top of an intermediary layer disposed above the top surface of the substrate such as an ink receiving layer (e.g., primer layer), a surface smoothening layer, a color neutralizing layer (e.g., white coat to mask the color of the substrate and provide a clean color surface to print), etc. In one aspect, the intermediate layer can include a single layer. In other aspects, the intermediate layer can have multiple sequentially stacked layers. In such aspects with multiple stacked intermediate layers, the ink can be printed on the outermost layer of the multiple intermediate layers.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system for printing on a substrate, the system comprising:

a conveyor that is configured to move the substrate along a substrate movement axis; and at least one print head array, wherein each print head array of the at least one print head array comprises a plurality of print heads, wherein each print head of the plurality of print heads has a respective orientation axis, wherein the plurality of print heads comprises at least a first print head and a second print head, wherein the orientation axis of the first print head is angularly offset from the orientation axis of the second print head, wherein the first print head is offset from the second print head along the substrate movement axis.

Aspect 2: The system of aspect 1, wherein the at least one print head array comprises a plurality of print head arrays, wherein each print head array of the plurality of print head arrays is offset from each other print head array of the plurality of print head arrays along the substrate movement axis.

Aspect 3: The system of aspect 2, wherein each print head array of the plurality of print head arrays is configured to print a respective color of ink, wherein a first print head array of the plurality of print head arrays is configured to print a first color of ink, and wherein a second print head array of the plurality of print head arrays is configured to print a second color of ink that is different than the first color of ink.

Aspect 4: The system of aspect 3, wherein the plurality of print head arrays comprises: a first print head array that is configured to print black ink, a second print head array that is configured to print cyan ink, a third print head array that is configured to print yellow ink, and a fourth print head array that is configured to print magenta ink.

Aspect 5: The system of aspect 4, further comprising a plurality of ink sources, wherein the plurality of ink sources comprises a first ink source comprising black ink and configured to supply ink to the first print head array, a second ink source comprising cyan ink and configured to supply ink to the second print head array, a third ink source comprising yellow ink and configured to supply ink to the third print head array, and a fourth ink source comprising magenta ink and configured to supply ink to the fourth print head array.

Aspect 6: The system of aspect 1, wherein the plurality of print head arrays further comprises a priming device that is configured to alter a surface energy of the substrate.

Aspect 7: The system of any one of the preceding aspects, further comprising a dispenser that is configured to dispense a primer.

Aspect 8: The system of any one of the preceding aspects, wherein each print head of the plurality of print heads is configured to print on a printing area of the substrate as the substrate passes thereby, wherein the printing area of each print head is no greater than 5 mm from said print head.

Aspect 9: The system of any one of the preceding aspects, wherein at least one print head of the plurality of print heads of each print head array of the at least one print head array is configured to print on a curved surface of the substrate.

Aspect 10: The system of any one of the preceding aspects, wherein the orientation axis of the first print head is angularly offset from the orientation axis of the second print head by at least 30 degrees.

Aspect 11: The system of any one of the preceding aspects, wherein the plurality of print heads of the at least one print head array comprises a third print head wherein the orientation axis of the third print head is angularly offset from the orientation axis of the first print head and the orientation axis of the second print head, wherein the third print head is offset from each of the first print head and the second print head along the substrate movement axis.

Aspect 12: The system of any one of the preceding aspects, wherein the plurality of print heads of the at least one print head array comprises a fourth print head, wherein the orientation axis of the fourth print head is parallel to the orientation axis of the first print head.

Aspect 13: The system of any one of the preceding aspects, wherein the plurality of print heads of the at least one print head array comprises a third print head wherein the orientation axis of the third print head is angularly offset from the orientation axis of the first print head and the orientation axis of the second print head, wherein the third print head is offset from each of the first print head and the second print head along the substrate movement axis.

Aspect 14: The system of any one of the preceding aspects, further comprising an ultraviolet source that is directed toward the substrate movement axis to cure ink deposited by the at least one print head array.

Aspect 15: The system of any one of the preceding aspects, further comprising an embossing station.

Aspect 16A: The system of any one of the preceding aspects, further comprising a spray coating station.

Aspect 16B: The system of any one of the preceding claims, further comprising a particle dispenser that is configured to dispense particles onto the substrate.

Aspect 17: The system of any one of the preceding aspects, further comprising a material cutter.

Aspect 18: The system of any one of the preceding aspects, further comprising a heater.

Aspect 19: The system of aspect 18, wherein the heater is an infrared heater.

Aspect 20: The system of any one of the preceding aspects, further comprising a dust removal assembly.

Aspect 21: The system of any one of the preceding aspects, wherein the substrate is a stair nose.

Aspect 22: The system of any one of aspects 1-20, wherein the substrate comprises decking, wall molding, or a furniture component.

Aspect 23: The system of any one of the preceding aspects, wherein the substrate comprises PVC, polystyrene, PET, ABS, MDF, or aluminum.

Aspect 24: The system of any one of the preceding aspects, wherein the conveyor comprises a plurality of transport wheels, wherein at least one transport wheel of the plurality of transport wheels is coupled to a motor, wherein the motor is configured to cause movement of the substrate along the substrate movement axis.

Aspect 25: The system of aspect 24, further comprising at least one guide wheel that is configured to bias the substrate toward the transport wheels.

Aspect 26: The system of aspect 25, further comprising opposed lateral guide wheels that are configured to bias the substrate toward each other to position the substrate along a transverse axis that is perpendicular to the substrate movement axis.

Aspect 27: The system of any one of the preceding aspects, further comprising a material position sensor that is configured to measure linear travel of the substrate along the substrate movement axis.

Aspect 28: The system of aspect 27, wherein the material position sensor is an encoder.

Aspect 29: The system of aspect 27 or aspect 28, further comprising at least one processor in communication with the material position sensor and each print head array of the at least one print head array, wherein the at least one processor is configured to coordinate printing of each print head of the plurality of print heads of the at least one print head array.

Aspect 30: The system of any one of the preceding aspects, further comprising:

an embossing assembly comprising:

a band formed into a loop, wherein the band has an embossing surface that defines a pattern; and at least one press roller that is configured to bias the loop against the substrate.

Aspect 31: A method comprising:

moving a substrate along a substrate movement axis, wherein the substrate has a surface having a first portion and a second portion, wherein the first portion or a plane tangential thereto is angularly offset from the second portion or a plane tangential thereto; and printing on the first portion and the second portion of the surface of the substrate during a single pass of the substrate along the movement axis.

Aspect 32: The method of aspect 31, wherein simultaneously printing on the first portion and the second portion of the surface of the substrate comprises printing with at least one print head array having a plurality of print heads, wherein the plurality of print heads comprises at least a first print head and a second print head, wherein an orientation axis of the first print head is angularly offset from an orientation axis of the second print head, wherein the first print head is offset from the second print head along the substrate movement axis.

Aspect 33: The method of aspect 31 or aspect 32, wherein printing on the first portion and the second portion of the surface of the substrate during the single pass of the substrate along the movement axis comprises simultaneously printing on the first and second portion of the substrate.

Aspect 34: The method of any one of aspects 31-33, wherein the method is performed with the system of any one of aspects 1-30, and wherein the method does not comprise embossing the substrate.

Aspect 35: A system for embossing a substrate, the system comprising:

a conveyor that is configured to move the substrate along a substrate movement axis;

an embossing assembly comprising:

a band formed into a loop, wherein the band has an embossing surface that defines a profile; and at least one press roller that is configured to bias the loop against the substrate.

Aspect 36: The system of aspect 35, wherein the at least one press roller comprises a plurality of press rollers.

Aspect 37: The system of aspect 36, wherein the plurality of rollers are offset along a transverse axis that is perpendicular to the substrate movement axis.

Aspect 38: The system of any one of aspects 35-37, wherein the at least one press roller has a circumferential surface that is complementary to at least a portion of a surface of the substrate.

Aspect 39: A method of embossing a substrate, the method comprising:

moving the substrate along a substrate movement axis; and biasing a band against the substrate, wherein the band has an embossing surface defining a profile.

Aspect 40: The method of aspect 39, wherein the substrate comprises a coating, the method further comprising curing the coating after biasing the band against the substrate.

Aspect 41: A system for printing on a substrate, the system comprising:

a conveyor that is configured to move the substrate along a substrate movement axis; and at least one print head array, wherein each print head array of the at least one print head array comprises at least one print head, wherein at least one print head of the at least one print head comprises a first plurality of nozzles spaced along a respective nozzle row axis, wherein the respective nozzle row axis of each print head is oriented at an acute angle relative to the substrate movement axis.

Aspect 42: The system of aspect 41, wherein the acute angle is between 20 and 70 degrees.

Aspect 43: The system of aspect 42, wherein the acute angle is between 30 and 60 degrees.

Aspect 44: The system of aspect 43, wherein the acute angle is about 45 degrees.

Aspect 45: The system of any one aspects 41-44, wherein at least one print head of the at least one print head comprises only the first plurality of nozzles spaced along the respective nozzle row axis.

Aspect 46: The system of any one aspects 41-44, wherein each print head of the at least one print head comprises a second plurality of nozzles that are spaced from the first plurality of nozzles along a respective nozzle column axis that is perpendicular to the respective nozzle row axis.

Aspect 47: The system of aspect 45, wherein the first plurality of nozzles are arranged in a first row, wherein the second plurality of nozzles are arranged in a second row, wherein the first row is offset from the second row along a second axis that is perpendicular to the respective nozzle row axis.

Aspect 48: The system of aspect 47, wherein the first plurality of nozzles are staggered from the second plurality of nozzles along the respective nozzle row axis.

Aspect 49: The system of aspect 47, wherein the first plurality of nozzles are not staggered from the second plurality of nozzles along the respective nozzle row axis.

Aspect 50: The system of any one aspects 41-49, wherein the first plurality of nozzles comprises at least 600 nozzles per inch.

Aspect 51: The system of any one aspects 41-50, wherein the respective nozzle row axis intersects each nozzle of the first plurality of nozzles.

Aspect 52: The system of any one aspects 41-51, wherein the at least one print head array comprises a plurality of print head arrays, wherein the plurality of print head arrays are spaced along the substrate movement axis.

Aspect 53: The system of aspect 52, wherein the plurality of print head arrays are each configured to print a respective color ink.

Aspect 54: The system of any one aspects 41-53, wherein each print head array of the at least one print head array comprises a plurality of print heads, wherein each print head of the plurality of print heads has a respective orientation axis, wherein the plurality of print heads comprises at least a first print head and a second print head, wherein the orientation axis of the first print head is angularly offset from the orientation axis of the second print head, wherein the first print head is offset from the second print head along the substrate movement axis.

Aspect 55: A method of using the system as in any one of aspects 1-30, 35-38, or 41-54, the method comprising:

moving a substrate along the substrate axis; and printing, using the at least one print head array, on the substrate.

Aspect 56: The method of aspect 55, wherein the substrate comprises a bevel, wherein printing on the substrate comprises printing on the bevel.

Aspect 57: The method of aspect 56, wherein printing on the bevel comprises printing on the bevel using at least two nozzles of the first plurality of nozzles.

Aspect 58: The method of any one of aspects 55-57, further comprising biasing a band against the substrate, wherein the band has an embossing surface defining a profile.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A method comprising:

moving a substrate along a substrate movement axis, wherein the substrate has a surface having a first portion and a second portion, wherein the first portion or a plane tangential thereto is angularly offset from the second portion or a plane tangential thereto, printing on the first portion and the second portion of the surface of the substrate with at least one print head during a single pass of the substrate along the movement axis, wherein each print head of the at least one print head comprises a first plurality of nozzles spaced along a respective nozzle row axis, wherein the respective nozzle row axis of each print head of the at least one print head is oriented at an acute angle relative to the substrate movement axis, and wherein a plane, that includes the respective nozzle row axis of each print head of the at least one print head and is parallel to the substrate movement axis, is spaced from the substrate movement axis.

2. The method of claim 1, wherein simultaneously printing on the first portion and the second portion of the surface of the substrate comprises printing with at least one print head array having a plurality of print heads, wherein the plurality of print heads comprises at least a first print head and a second print head, wherein an orientation axis of the first print head is angularly offset from an orientation axis of the second print head, wherein the first print head is offset from the second print head along the substrate movement axis.

3. The method of claim 2, wherein the at least one print head array comprises a plurality of print head arrays, wherein each print head array of the plurality of print head arrays is offset from each other print head array of the plurality of print head arrays along the substrate movement axis.

4. The method of claim 3, wherein each print head array of the plurality of print head arrays is configured to print a respective color of ink, wherein a first print head array of the plurality of print head arrays is configured to print a first color of ink, and wherein a second print head array of the plurality of print head arrays is configured to print a second color of ink that is different than the first color of ink.

5. The method of claim 4, wherein the plurality of print head arrays comprises a first print head array that is configured to print black ink, a second print head array that is configured to print cyan ink, a third print head array that is configured to print yellow ink, and a fourth print head array that is configured to print magenta ink.

6. The method of claim 1, further comprising dispensing a primer onto the substrate.

7. The method of claim 6, wherein the primer is configured to alter a surface energy of the substrate.

8. The method of claim 2, wherein each print head of the plurality of print heads is configured to print on a printing area of the substrate as the substrate passes thereby, wherein the printing area of each print head is no greater than 5 mm from said print head.

9. The method of claim 2, wherein at least one print head of the plurality of print heads of each print head array of the at least one print head array is configured to print on a curved surface of the substrate.

10. The method of claim 2, wherein the orientation axis of the first print head is angularly offset from the orientation axis of the second print head by at least 30 degrees.

11. The method of claim 2, wherein the plurality of print heads of the at least one print head array comprises a third print head, wherein an orientation axis of the third print head is angularly offset from the orientation axis of the first print head and the orientation axis of the second print head, and wherein the third print head is offset from each of the first print head and the second print head along the substrate movement axis.

12. The method of claim 11, wherein the plurality of print heads of the at least one print head array comprises a fourth print head, wherein an orientation axis of the fourth print head is parallel to the orientation axis of the first print head.

13. The method of claim 1, further comprising measuring linear travel of the substrate along the substrate movement axis using a material position sensor.

14. The method of claim 1, further comprising dispensing, by a spray coating station, a coating onto the substrate.

15. The method of claim 14, further comprising dispensing, by a particle dispenser, particles onto the substrate, wherein the particle dispenser is positioned downstream of the spray coating station so that the particles adhere to the substrate by a coating deposited on the substrate.

16. The method of claim 1, wherein the substrate comprises a bevel, wherein printing on the substrate comprises printing on the bevel.

17. The method of claim 16, wherein each print head of the at least one print head comprises a first plurality of nozzles spaced along a respective nozzle row axis, wherein the respective nozzle row axis of each print head of the at least one print head is oriented at an acute angle relative to the substrate movement axis, wherein printing on the bevel comprises printing on the bevel using at least two nozzles of the first plurality of plurality of print nozzles.

18. The method of claim 1, wherein the substrate is a stair nose.

19. The method of claim 1, wherein the substrate is decking, wall molding, trim, or a furniture component.

20. The method of claim 1, further comprising embossing a material on the substrate with an embossing assembly, the embossing assembly comprising:

a band formed into a loop, wherein the band has an embossing surface that defines a pattern; and at least one press roller that is configured to bias the loop against the substrate.

* * * * *